(12) United States Patent
Holtz

(10) Patent No.: US 12,185,447 B2
(45) Date of Patent: *Dec. 31, 2024

(54) INDUCTION HEATING SURFACE

(71) Applicant: Spring (U.S.A.) Corporation, Naperville, IL (US)

(72) Inventor: Kristine Holtz, Wayne, IL (US)

(73) Assignee: Spring (U.S.A.) Corporation, Naperville, IL (US)

(*) Notice: Subject to any disclaimer, the term of this patent is extended or adjusted under 35 U.S.C. 154(b) by 128 days.

This patent is subject to a terminal disclaimer.

(21) Appl. No.: 16/883,235

(22) Filed: May 26, 2020

(65) Prior Publication Data
US 2020/0374989 A1 Nov. 26, 2020

Related U.S. Application Data

(60) Provisional application No. 62/852,067, filed on May 23, 2019.

(51) Int. Cl.
*H05B 6/12* (2006.01)
*A47J 36/24* (2006.01)

(52) U.S. Cl.
CPC ........ *H05B 6/1209* (2013.01); *A47J 36/2483* (2013.01)

(58) Field of Classification Search
CPC ............. A47J 36/2483; H05B 2213/05; H05B 6/062; H05B 6/1209
USPC ....................................................... 219/620
See application file for complete search history.

(56) References Cited

U.S. PATENT DOCUMENTS

| | | | | |
|---|---|---|---|---|
| 3,786,222 A | * | 1/1974 | Harnden, Jr. | ............ H05B 6/06 219/622 |
| 5,376,774 A | * | 12/1994 | McGaffigan | ........... H05B 6/065 336/232 |
| 5,866,884 A | | 2/1999 | Cornec et al. | |
| 6,614,006 B2 | | 9/2003 | Pastore et al. | |

(Continued)

FOREIGN PATENT DOCUMENTS

| | | | | |
|---|---|---|---|---|
| CN | 109838821 A | * | 6/2019 | ........... H05B 6/1218 |
| DE | 102014224051 A1 | * | 5/2016 | ............. H05B 6/062 |

(Continued)

OTHER PUBLICATIONS

16883235_2022-03-25_EP_3021639_A1_M-pdf.pdf (Year: 2016).*

(Continued)

*Primary Examiner* — Nathaniel E Wiehe
*Assistant Examiner* — Ket D Dang

(57) ABSTRACT

An illustrative induction heating surface capable of heating one or more multiple-sized servers and/or pots at any location on the range top using a plurality of preconfigured heating settings including low (145-155 F), low-med (156-165 F), med-high (166-175 F), and high (176-185 F). The illustrative induction heating surface may be configured for automatically switch off 2 minutes after pans are removed. The induction heating surface is compatible with all induction ready servers and pans and may include a durable, easy to clean simulated stone surface. The illustrative heating surface may be configured as a portable unit for countertop use, as a built-in unit for installation in a countertop or other surface, and/or the unit may be configured for both countertop or drop-in use.

20 Claims, 6 Drawing Sheets

(56) References Cited

U.S. PATENT DOCUMENTS

| | | | |
|---|---|---|---|
| 6,930,287 | B2 | 8/2005 | Gerola et al. |
| 7,759,616 | B2 | 7/2010 | Gouardo et al. |
| 9,290,890 | B2 | 3/2016 | Naylor |
| 9,402,284 | B1 | 7/2016 | Brija |
| 9,534,793 | B2 | 1/2017 | Magdalena et al. |
| 11,039,508 | B2 * | 6/2021 | Schmidt ............... H05B 6/1245 |
| 2009/0008384 | A1 | 1/2009 | Roux |
| 2010/0163548 | A1 * | 7/2010 | Cretors ................ H05B 6/12 219/620 |
| 2012/0024840 | A1 * | 2/2012 | Lee ..................... H05B 6/062 219/622 |
| 2012/0294990 | A1 | 11/2012 | Graber et al. |
| 2015/0008216 | A1 * | 1/2015 | Pippia ................ H05B 1/0266 219/664 |
| 2015/0028022 | A1 | 1/2015 | Moon et al. |
| 2015/0245417 | A1 | 8/2015 | Fattorini et al. |
| 2016/0150600 | A1 | 5/2016 | Lomp et al. |
| 2016/0330799 | A1 | 11/2016 | Leyh et al. |
| 2017/0339751 | A1 * | 11/2017 | Meng ................. H05B 6/062 |
| 2017/0367529 | A1 * | 12/2017 | Metz .................. H05B 6/1209 |
| 2018/0025838 | A1 * | 1/2018 | Som ................... H05B 6/062 361/143 |
| 2019/0254125 | A1 * | 8/2019 | Milanesi ............. H05B 6/065 |
| 2020/0100332 | A1 * | 3/2020 | Inoshita ............. H05B 6/6455 |

FOREIGN PATENT DOCUMENTS

| | | | |
|---|---|---|---|
| EP | 2664216 | A1 | 11/2013 |
| EP | 2840867 | A1 | 2/2015 |
| EP | 2931005 | A1 | 10/2015 |
| EP | 3021639 | A1 * | 5/2016 ............ H05B 6/065 |
| FR | 2984463 | A1 | 6/2013 |
| WO | WO-2008058614 | A1 * | 5/2008 ........... H05B 6/1272 |
| WO | 2014108521 | A1 | 7/2014 |
| WO | 2015015373 | A1 | 2/2015 |

OTHER PUBLICATIONS

Incogneeto_Induction_Warmer.pdf (Year: 2015).*
ABK ICI0401 i-Cooking Induction Hob to fit directly into the worktop, May 9, 2017, 3 pgs.
Anywhere Induction System, Bon Chef, The Art of Food Presentation, Food Service Equipment, May 9, 2017, 2 pgs.
ACM 938 (77 CM)—Built in Hobs Built in Appliances—Whirlpool India, https://www.whirlpoolindia.com, May 9, 2017, 4 pgs.
Induction cooktops, Bosch, http://www.bosh-home.com.au/productlist/cooking-baking/cooktops/inductions-cooktops, May 9, 2017, 7 pgs.
Flex Induction, Siemens, http://www.siemens-home.bsh-group.com/au/flexinduction, May 9, 2017, 4 pgs.
36 inch Masterpiece Series Freedom Induction Cooktop CIT36XKBB, Thermador, http://www.thermador.com/cooking/cooktops/cit36xkbb-36-inch-masterpiece-series-freedom-induction-cooktop, May 9, 2017, 2 pgs.
Q700 80 cm Induction cooktop. Siemens, http://www.siemens-home.bsh-group.com/au/productlist/cooking/cooktops/induction/EH875KU12E#/tab+section-technicalspecs, May 9, 2017, 3 pgs.
Full surface induction cooktop CX 480 111, Gaggenau, http://www.gaggenau.com/GB/product/CX480/variation/CX480111#close, May 9, 2017, 5 pgs.
MIRAGE Buffet Induction Warmers, Vollrath, www.vollrath.com, May 10, 2017, 5 pgs.
The SMART Induction Warmer uses as little as 100 watts!, SMART Buffet Ware, https://smartbuffetware.com/products/item/1AIW110V, May 10, 2017, 1 pgs.
INCOGNEETO Induction Warmer, VIKING Professional, vikingrange.com, May 10, 2017, 2 pgs.
MAX Induction, Built-In (Hold-Only) Induction Warmer, Spring USA, www.springsusa.com, Mar. 2011, 2 pgs.
Siemens full-surface induction cooktop lets you arrange the pans whereever you like, https://newatlas.com/siemens-full-surface-induction-cooktop/22236/, May 5, 2017, 5 pgs.
Siemens flexinduction Cooktops, http://www.siemens-home.bsh-group.com/au/flexinduction, May 5, 2017, 6 pgs.
Vollrath Mirage Buffet Induction Warmers—WebstaurantStore TV Video, https://www.webstaurantstore.com/video-3229/vollrath-mirage-buffet-induction-warmers, May 21, 2018, pp. 2.

* cited by examiner

INDUCTION HEATING SURFACE

RELATED APPLICATIONS

This application claims priority to U.S. Provisional Patent Application No. 62/852,067 filed May 23, 2019, which is incorporated by reference in its entirety herein.

BACKGROUND

While induction heating surfaces are generally more expensive than electric cooktops, induction heating surfaces are becoming more popular because of their higher efficiency and the safety features associated with them. They come in various models and configurations, including countertop and built-in models that may be packaged in dual or single warmer configurations. As the name implies, countertop models are used while sitting on top of a counter while built-in models are generally dropped into a countertop before use.

In general, induction ranges may be configured with a heating element positioned to heat a pot placed in a specific portion of the top surface of the induction range, often indicated with a shape (e.g., a circle, a square) inscribed or otherwise marked on the surface. This design limits the ability of the range heating the single pot when placed in the indicated area, even when additional surface area is available. Therefore, a need has been recognized for an indication heating surface capable of warming one or more pots placed at any location on the warming surface.

SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the present disclosure are directed to an induction heating surface that may be used either as a countertop warming unit or as a built-in warming unit. The control box used to power the induction heating elements may be detached from the enclosure of the induction heating surface, such that a standalone unit may be used in a countertop configuration (e.g., with the control unit attached to an enclosure of the device) or in a built-in configuration (e.g., with the control unit being detached from the enclosure of the device) such that the control panel is accessible at an exterior of a counter or piece of furniture in which the induction heating unit is installed.

Aspects of the present disclosure are directed to an induction heating surface that may be used to heat one or more pots placed anywhere on the top surface of the range and may have the ability to read induction ready vessels placed anywhere on the surface. In some cases, the induction heating surface may be used for warming or otherwise cooking food.

Aspects of the present disclosure are directed to an induction heating surface that may include one or more heating elements that may be capable of heating sensed vessels. The induction heating surface may also include a number of sensors, such as temperature sensors, current sensors, voltage sensors and the like. The control box may be used for setting a heating temperature selected from a number of pre-specified temperature ranges. The induction heating surface may include one or more built-in receptacles capable of daisy chaining a number of ranges on a single circuit.

In some cases, an induction heating surface may be used as a countertop warming unit or as a built-in warming unit, which may be exposed or hidden. For example, the induction heating unit may be a stand-alone unit configured to sit atop a surface, such as a countertop, and be capable of being moved to other positions. An illustrative countertop unit may have a top surface of one or more materials, such as a solid surface (e.g., tempered glass) of a particular thickness (e.g., about 5 mm, about 6 mm, etc.).

In some cases, a unit may be built into furniture (e.g., a podium, a movable serving unit, a counter, a table, and the like). In an illustrative example, such a built-in unit may have a similar top surface (e.g., a tempered glass surface, a simulated stone surface, or the like) and may be capable of being dropped into an opening in a counter. In some cases, the built-in unit may be flush mounted or may sit slightly above the counter. In such cases, the top surface of the induction heating surface remains visible to a user.

In some cases, a hidden unit may be built into a piece of furniture, counter, or table, such that the top surface of the induction heating surface is hidden from the user. For example, a hidden unit may have a top surface (e.g., a mica surface, a glass surface) of a particular thickness (e.g., about 1 mm), with holes in the surface to expose temperature sensors installed adjacent to induction coils of the device. In such cases where the induction heating surface is hidden from view, the top surface of the unit may be a thin surface (e.g., mica, etc.) that may include holes or other opening to cause the sensors to be in closer proximity to a bottom surface of a countertop (or other such surface) hiding the induction heating surface from view, so that the induction heating unit may sense a heat applied to a vessel atop the installed surface. Such countertops may be smart stone, glass, natural stone, or other surfaces.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

A more complete understanding of aspects of the present disclosure and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings, which form a part hereof, and in which is shown by way of illustration various embodiments in which the disclosure may be practiced. It is to be understood that other embodiments may be utilized and structural and functional modifications may be made.

In current induction heating units, induction ready vessels must be placed in a specific location on the range to be within the magnetic field and for the sensor to read the temperature of the vessel. This limits use of these induction heating units (e.g., an induction heating surface) to specific applications, such as applications that limited in how properly warmed food can be displayed and/or how many vessels can be placed on a single induction heating surface. As such, a need has been recognized for an induction heating surface upon which a vessel can be placed anywhere on the surface of the range. Such a device will increase usage possibilities for these induction ranges and minimize limitations on displaying warmed food. Also, in some cases, multiple coils and/or sensors may be distributed across the device to allow heating over an entire surface of the range. This means multiple vessels can be placed on a single induction heating surface at a time and at any place on the surface. In some cases, a heating surface may be desired to be hidden to allow a surface (e.g., a work surface, a display surface, etc.) to be used as a multi-functional surface that may be used without fear of damaging a component of the induction heating unit. For example, a table may have a hidden induction heating surface unit hidden underneath a top of the table, such that the table may be used as a standard table and/or for heating or cooking as needed to create a multifunctional work surface.

Figure 1:
FIG. 1 illustrates an exterior view of an induction heating surface capable of heating one or more vessels placed on its surface according to aspects of the present disclosure.

FIG. 1 illustrates an exterior view of an induction heating surface 100 capable of heating one or more vessels placed on a surface 110 hiding the induction heating surface unit according to aspects of the present disclosure. The induction heating surface 100 may have one or more configurations, such as a stand-alone configuration (e.g., a countertop configuration), a built-in configuration (e.g., a drop-in configuration), or the like. In some cases, a configuration may be installed under a substantially flat surface 110, legs to elevate an enclosure of a countertop configuration of an induction heating surface 100 from a counter surface, and a control panel 130 to control the heating of one or more sensed vessels placed on the top surface. In some cases, the control panel 130 may be detached or detachable from the induction heating surface 100, or may be physically attached or attachable to the induction heating surface. The illustrative induction heating surface 100 is shown having a substantially rectangular shape with dimensions of about 4" in height, with a top surface having a thickness of approximately 12 mm (e.g., about 05 inches) and about 24 inches in width and 22 inches in depth, but other shapes and dimensions are contemplated, including a square heating surface shape, a circular heating surface shape, an oval heating surface shape, and/or the like. In some cases, the surface 110 hiding the induction heating surface unit may have a different shape than the enclosure.

Features of an illustrative induction heating surface 100 may include the ability to daisy-chain a plurality of units into one 20 amp/120-volt circuit, such as by using an additional power receptacle (not shown) in the back of the enclosure of the unit. In some cases, a power cord may be detachable from the power receptacle on the enclosure of the induction heating surface. In other cases, a power cord may be integral to the induction heating surface. In some cases, one or more power receptacles may be installed in the enclosure, such that electric power may be supplied to the unit, such as via a male power receptacle, and/or electric power may be provided to one or more external devices (e.g., other induction heating surfaces), via a detachable power cord and a female power receptacle. In some cases, one or more female power receptacles may be installed to provide an electric power output to an external device. The power cord may be provided in one or more predefined lengths and may include a male power connector on a first end and a female power connector on a second end. In some cases, a power cord may include a same connector (e.g., a male connector) on each end, such that power may be supplied between different induction heating surface units.

The illustrative induction heating surface 100 may be capable of heating one or more servers and/or pots of multiple sizes at any location on the range top using a plurality of preconfigured heating settings (e.g., one or more heat setting inputs 140) including a low (e.g., 145-155 F) heat setting, a low-med (e.g., 156-165 F) heat setting, a med-high (e.g., 166-175 F) heat setting, and a high (e.g., 176-185 F) heat setting, but other configurations may be implemented with more or less preconfigured heating settings and/or with a configurable range of heating settings. In some cases, the heat settings may be commanded by a user via one or more use inputs on the control panel 130. For example, the one or more heat setting inputs may be provided on the control panel 130 to receive a user-supplied heat setting input to heat vessels placed on the surface to a temperature corresponding to one of the plurality of preconfigured heat settings. The one or more heat setting inputs may include one or more input devices (e.g., a switch, a rotary input device, a multi-position switch, a digital input, a dial, and the like), to allow a user to select a desired heat setting. In some cases, the control panel 130 may include one or more output devices (e.g., light emitting diodes (LEDs), a digital display, etc.) to provide a visual indicator to the use of a selected heat setting, an indication that the induction heating surface 100 is on, and/or the like.

The illustrative induction heating surface 100 may be configured to automatically switch off after a predetermined duration (e.g., 1 minute after pans are removed, 2 minutes after pans are removed, etc.) as sensed by the induction heating surface's built-in controller, discussed below. The induction heating surface 100 may be compatible with all induction ready servers and pans and may include a durable, easy to clean surface, of one or more materials, such as an engineered stone surface, a natural stone surface, a glass surface, a simulated wood surface, a ceramic surface, and the like. The illustrative heating surface 100 may be configured as a portable unit for countertop use, as a built-in unit for installation in a countertop or other surface, and/or the unit may be configured for both countertop or drop-in use. No flame or radiant heat means a safer, cooler environment in which warmed food may be presented.

The surface 110 hiding the induction heating surface 100 may include a heating surface that may allow heating of vessels above the heating coil without heating other uncovered portions of the surface (e.g., a simulated stone surface, a natural stone surface, a tempered glass surface, a simulated wood surface, a ceramic surface, etc.). One or more vessels may be placed anywhere on the surface to be sensed for heating. The heating surface may include a finished edge portion of the particular surface material and/or other border material (e.g., a metal edge, a plastic edge, and/or the like). In some cases, such as in a built-in configuration, an edge of the induction heating surface main includes an edge configured to minimize a visible difference between the induction warming surface and the surrounding countertop surface. For example, the induction heating surface may include a top surface made of a material substantially similar or the same as the surrounding countertop, where a fit between the two surfaces may be designed to minimize a visible differentiation (e.g., a minimal fit tolerance) between the two surfaces. In some cases, the induction heating surface may include an edge of a contrasting or different material to highlight the different surface areas. The top (e.g., heating) surface of the induction heating surface may be without markings that would be indicative of a particular location on the top surface for vessel placement. The top surface of the induction heating surface, as shown in FIG. 1 may be a solid color, a pattern, or a combination of colors and/or patterns. In some cases, the finished edge portion may be raised from the top of the heating surface or may be flush with the top of the heating surface. In some cases, the finished edge portion of the surface 110 hiding the induction heating surface unit 100 may or may not include a beveled edge.

In some cases, the control panel 130 may be removable from the enclosure of the induction heating surface 100 and may be attached to the enclosure with one or more fasteners, including, but not limited to, screws, bolts, clips, and/or the like. The control panel 130, or other portion of the enclosure, may include electronics to control an amount of heat provided by one or more induction heating elements. In some cases, the control panel 130 may include inputs and/or outputs for user interaction with the induction warming surface. The control panel 130, or other portion of the enclosure, may include an on/off button and one or more temperature setting inputs, such as those discussed above. Additionally, the control panel 130 may also include a visual and/or graphical indication that the induction heating surface 100 is turned on and/or heating one or more vessels placed on the surface. For example, the control panel may include an output portion including one or more visual indicators, such as an LED, a digital display, a liquid crystal display and/or the like. In some cases, the temperature setting inputs may include a plurality of individual pre-defined temperature settings. For example, the temperature settings may include four temperature settings: low (e.g., 145-155 F), low-med (e.g., 156-165 F), med-high (e.g., 166-175 F), and high (e.g., 176-185 F). In some cases, the temperature setting may be set to a specified temperature by a user, such as by using a variable temperature input or digital input device capable of receiving a specified temperature entry. In some cases, the induction heating surface, whether used in a counter top configuration, in an exposed built-in configuration, or in a hidden built-in configuration, may be configured with different temperature settings, such as those of a range or other cooktop. In such cases, the induction heating surface unit 110 may be used for cooking or other heating of vessels to higher temperatures (e.g., a temperature greater than about 185 degrees Fahrenheit).

FIGS. 2A-2E show a top down views of an induction heating surface 100 with a top surface removed and exposing a of heating element (sometimes referred to as coils) and a plurality of sensors according to aspects of the present disclosure. In some cases, the heating element 210 may be formed of a single coil of wire. In some cases, the heating element 210 may comprise an array of individual coils or banks of coils. In some cases, the heating element may be formed into multiple sections, such as individual coils 212 of the same wire 211. In some cases, the induction heating surface 200 may include multiple individual heating elements each formed from a different wire, where one or more of these individual heating elements may be formed into a single section or multiple different sections. In the illustrative example of FIG. 2A, the induction heating surface 200 includes an array of four single heating elements 210, each comprising three individual coil shaped sections 212, and each coil-shaped section 212 is configured as a coil of wire capable of induction heating of vessels placed above the heating elements. In some cases, each coil-shaped section 212 may be independently formed using a portion of the same wire 211. For example, the individual coils may be formed from a continuous conductive element, (e.g., a wire 211) from an input connection to an output connection at which electrical power may be applied to the heating coils 210. In some cases, the induction heating element 210 may be configured to be installed beneath or within an interior cavity of a surface material (e.g., a simulated stone material) to be hidden from view. In some cases, the exterior surface may be a top surface, such as in a drop-in configuration. In some cases, the exterior surface may include a cavity that may enclose top and side surfaces of an induction heating element unit, comprising one or more induction heating elements 210. In some cases, the induction heating element unit may include one or more induction heating elements of various configurations.

The induction heating surface 200 may be rated for a specified power level (e.g., about 1000 watts, about 1200 watts, about 1300 watts, about 1800 watts, about 2000 watts, etc.), a specified current level (e.g., about 2.0 amps, about 2.5 amps, 3.0 amps, about 10 amps, about 20 amps, etc.), and operation within a specified AC voltage range and frequency, such as the range of 110-120 volts at 50 or 60 Hertz, 215-245 volts at 50 or 60 Hertz, and the like. The induction heating surface 200 may also provide at least one built-in receptacle for daisy-chaining a plurality of induction heating surfaces together. In some cases, the receptacle may correspond to international power outlet standard, a wiring connector, a terminal block connector, and/or the like. For example, in a first configuration the induction heating surface 200 may be capable of daisy chaining two or more induction ranges, and/or other devices, on a particular circuit, such as by using a power cord including 14-gauge wire. In some cases, the induction heating surface 200 may be capable of daisy-chaining more induction heating surfaces by incorporating a power cord having a larger-gauge wire (e.g., 12-gauge wire, 10-gauge wire, etc.) or fewer ranges by incorporating a cord having a smaller-gauge wire (e.g., 16-gauge, etc.).

Figure 2A:
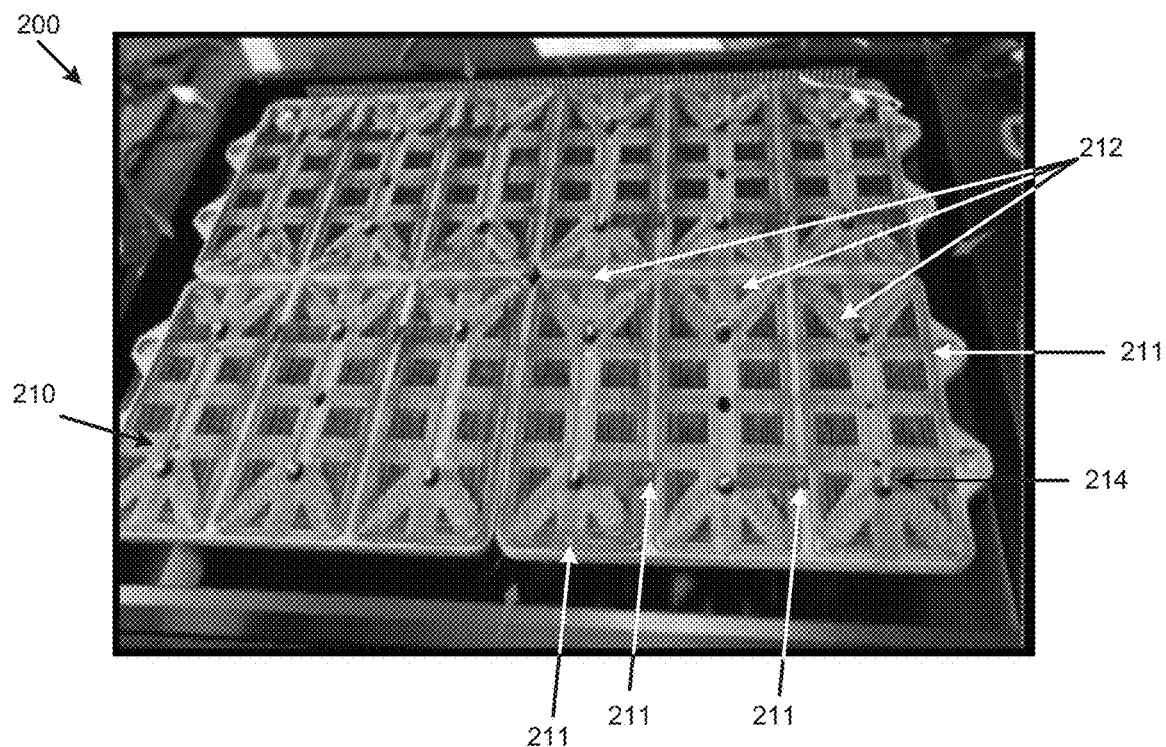
FIGS. 2A-2E show illustrative top down views of an induction heating surface with the top surface removed exposing one or more heating elements and a plurality of sensors according to aspects of the present disclosure.

In the illustrative example of FIG. 2A, the induction heating surface 200 includes a plurality of temperature sensors 214 (e.g., 24 temperature sensors) and three sections of the heating element 210 in each element of a 4-element coil array. In some cases, the heating element 210 and/or portions thereof may be used as sensors, where feedback signals being used by the induction range controller to determine whether or not a vessel is placed on the range surface. For example, a current and/or voltage value associated with individual coils may be used by the control unit to determine placement, size and/or shape of the one or more vessels placed on the surface of the induction heating surface. In some cases, the sections of the heating element 210 may be shaped as an oval or rounded-rectangular shape, as shown, or may be formed into other shapes (e.g., a square, circle, rectangle, hexagon, and the like). In the illustrative example of FIG. 2A, each loop of the three-loop configuration for each of the four sections of the heating element 210 may be configured as 18 strand×36 loop, with 0.3 mm diameter wire and may have an inductance of approximately L=90 uH±5. The heating sensors 214 may be one or more different temperature sensors including a PTC type sensor, an NTC type sensor, a thermistor, and/or the like. In the illustrative example, the temperature sensors may be an NTC type sensor having a rating of 100K ±2%.

In the illustrative example of FIG. 2A, the three sections of each array portion of the heating element 210 may be evenly distributed beneath a portion the heating surface (e.g., a surface 110 hiding the induction heating unit, a top surface of a countertop unit, and the like), such that the majority of the heating surface is capable of heating vessels placed on the surface. The heating element 210 may be supported beneath the heating surface by a structure 216 that may have at least some characteristics of a thermal insulator. In some cases, at least a portion of the structure 216 may be made of a thermal insulating material such as ceramic. While the illustrative coil distribution pattern is shown as a 2×2 array of three coils located side-by-side along the width of the induction heating surface and extending approximately the effective length of the interior portion of the induction heating surface enclosure. In some cases, other distribution patters for coil placement may be contemplated, such as a grid-pattern, and the like. As shown in FIG. 2A, the temperature sensors may be distributed to sense a temperature of at least a zone of the heating surface, such as to determine a heat applied to a portion of the surface holding a vessel placed on top. In some cases, the temperature sensors 214 may be used as an input into an algorithm for controlling an amount of heating energy provide by the heating element coils 210 and/or for determining a size and/or shape of the vessel(s) being heated. In some cases, one or more other sensors may be used, such as current sensors, pressure sensors, and the like. Such sensors may be placed beneath the heating surface, or at another location within the enclosure of the induction heating surface unit.

Figure 2B:
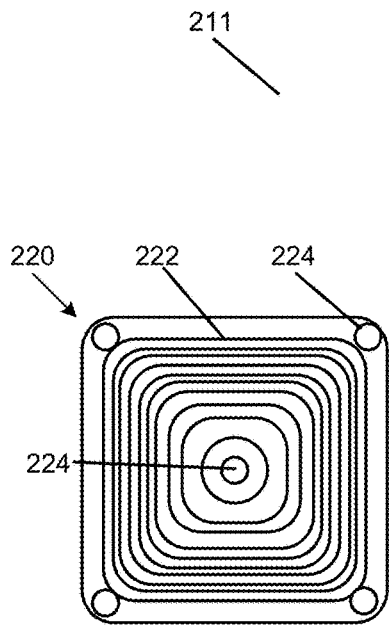
Figure 2C:
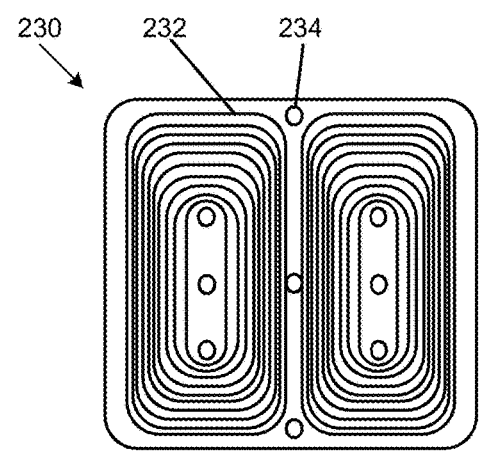
Figure 2D:
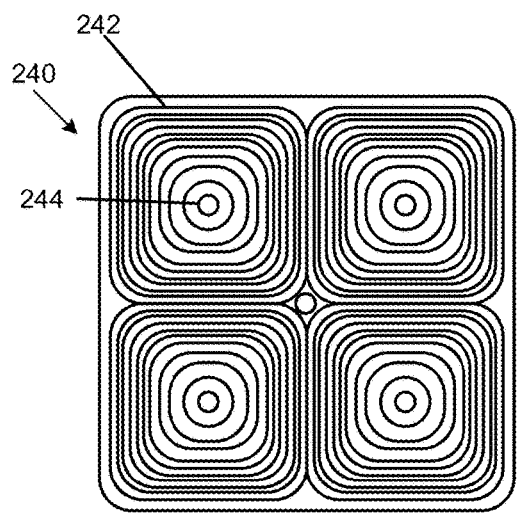
Figure 2E:
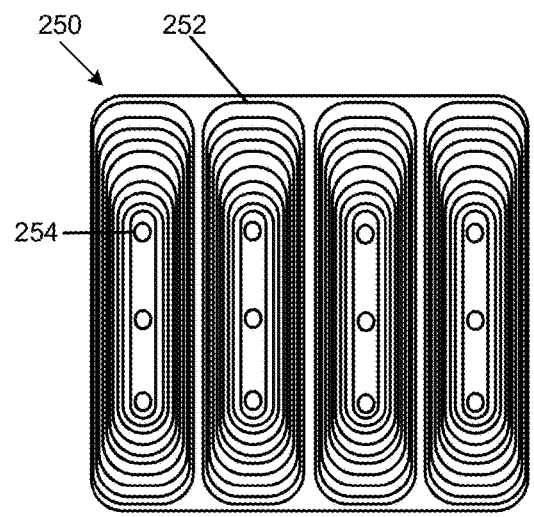

While FIGS. 2B-2E show other illustrative coil arrangements for use in an induction heating surface according to aspects of this disclosure, other coil shapes and/or arrangements of sensors are also be contemplated. In some cases, the coil arrangements shown in FIGS. 2B-2E may be individual heating elements, portions of a same heating element or combinations of different heating elements and portions of a same heating element. In some cases, the coil arrangements shown in FIGS. 2B-2E may be used as a complete coil configuration for an induction heating surface 100, or may be used as part of an array of coils or coil configurations used within the induction heating surface 100. FIG. 2B shows an illustrative induction heating surface 220 having a single heating element coil 222 shaped as a rounded rectangle and a plurality of sensors (e.g., temperature sensors) 224 disposed underneath the heating surface. FIG. 2C shows an illustrative induction heating surface 230 having two heating element coils 232 shaped as elongated rounded rectangles and a plurality of sensors (e.g., temperature sensors) 234 disposed underneath the heating surface. FIG. 2D shows an illustrative induction heating surface 240 having four heating element coils 242 shaped as rounded rectangles and a plurality of sensors (e.g., temperature sensors) 244 disposed underneath the heating surface. FIG. 2E shows an illustrative induction heating surface 250 having four heating element coils 252 shaped as elongated rounded rectangles and a plurality of sensors (e.g., temperature sensors) 254 disposed underneath the heating surface. As discussed above, each coil of the illustrative heating elements of FIGS. 2B-2D may be formed from a same conductor.

Figure 3:
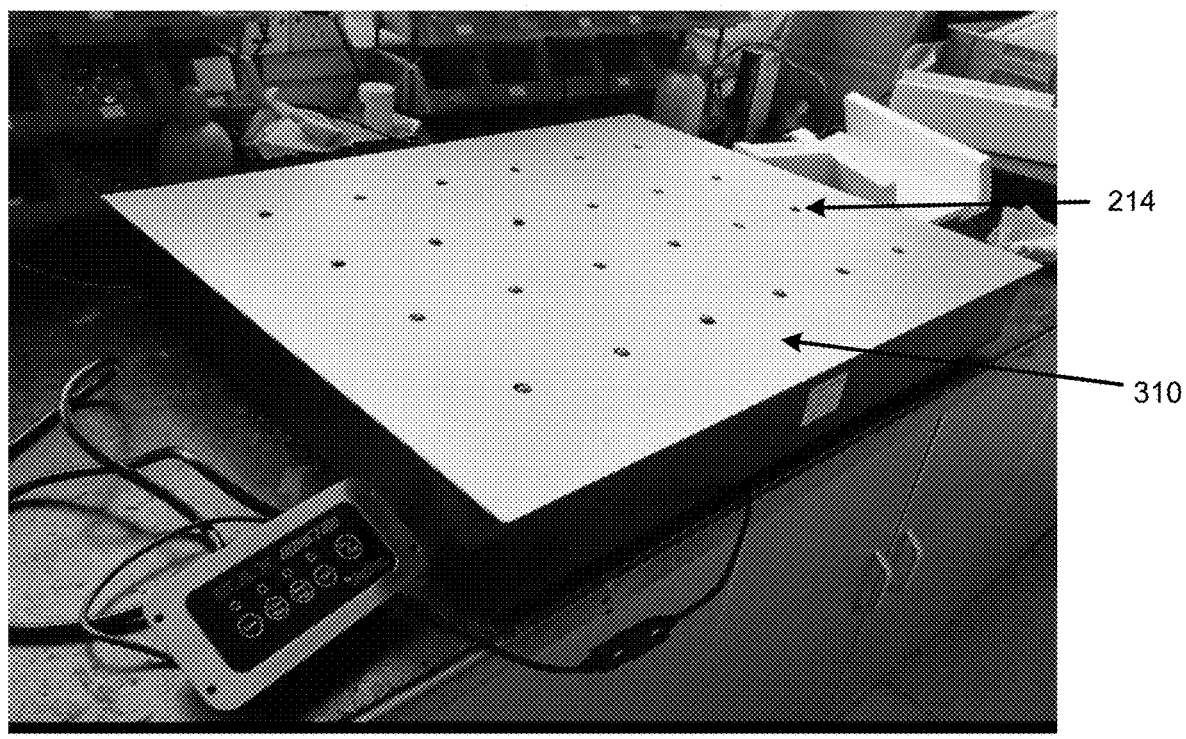
FIG. 3 shows an induction heating unit with the exterior top surface removed according to aspects of the present disclosure.

FIG. 3 shows an induction heating unit with the exterior top surface removed according to aspects of the present disclosure. Here, the control unit is shown to be in a detached configuration capable of being separately mounted on an installation unit (e.g., counter top, a side surface of a cabinet enclosure, and the like). In some cases, the top surface may be a decorative surface (e.g., a simulated stone surface) integrated into the induction heating surface unit. In some cases, an induction heating surface may include an enclosure including a top cover 310 installed over the coil and having a plurality of openings through which temperature sensors 214 may be exposed to a surface installed over the top cover, such as the surface upon which vessels may be placed (e.g., a simulated stone surface). The illustrative induction heating surface may be capable of heating a single vessel or multiple different sized vessels. In some cases, the induction heating surface may be capable of sensing a location of any sized vessel or vessels placed upon the heating surface. In some cases, the induction heating surface may be capable of sensing a vessel or a plurality of vessels having at least a minimum surface area, a minimum linear geometric dimension (e.g., a diameter, a side, and the like). In an illustrative example, a minimum dimension of a pot may be a linear geometric dimension of about 5 centimeters, 10 centimeters, 12 centimeters, 15 centimeters, and the like. In some cases, illustrative induction heating surface may be capable of heating multiple different sized vessels.

Figure 4:
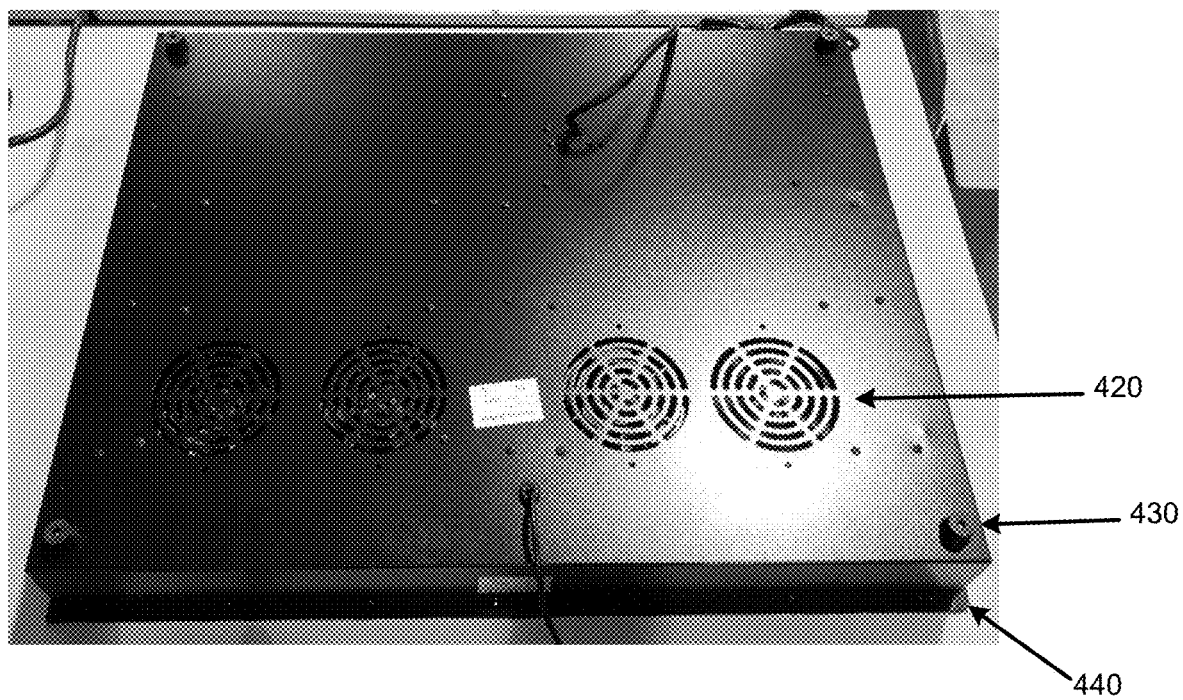
FIG. 4 shows a bottom surface of an illustrative induction heating unit according to aspects of the present disclosure.

FIG. 4 shows a bottom surface of an illustrative induction heating unit enclosure according to aspects of the present disclosure. Here, the illustrative enclosure may include one or more vents or other openings 420 to provide ventilation or other cooling within the induction heating unit enclosure. In some cases, passive airflow cooling may be contemplated. In some cases, forced-air cooling may be used, such as by using one or more fans to move heated air out of the induction heating surface enclosure and/or cooler air into an interior cavity of the induction heating surface enclosure. In some cases, the enclosure may include one or more feet 430, or other such feature, capable of elevating the bottom of the induction heating surface enclosure above another surface. In some cases, the enclosure may include a lip 440, or other feature capable of suspending the induction heating surface from an opening in a countertop, or other surface, and/or for supporting a heating surface material (e.g., a simulated stone material) above the top surface 310 of the enclosure.

Figure 5:
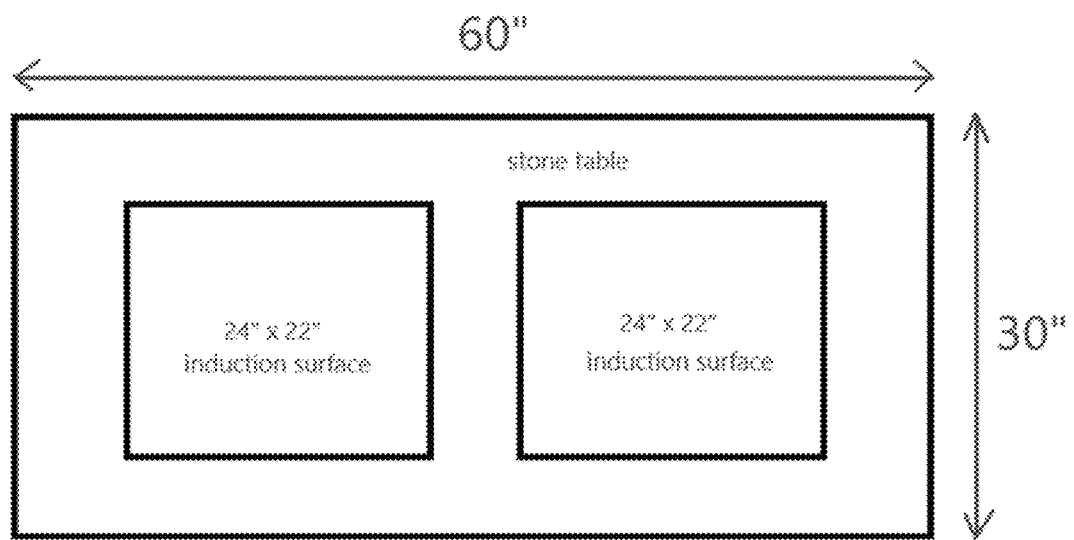
FIG. 5 shows a line drawing illustrating a plurality of induction heating surfaces in an installation according to aspects of the present disclosure.

FIG. 5 shows a line drawing illustrating a plurality of induction heating surfaces, 510, 550 in a built-in installation 500 according to aspects of the present disclosure. As discussed above, the induction heating surfaces 510 and 550 may be configured to be built-in, such as to be dropped into a countertop surface. In some cases, the surface material of the countertop and the induction heating surface may be the same material, similar materials, or different materials. In some cases, the induction heating surfaces 510 and 550 may be configured to be mounted flush to the countertop surface. In some cases, the surface of the induction heating surface may be configured to be above (e.g., about ⅛ inch, about ¼ inch) the surface of the countertop. In some cases, a plurality of induction heating surfaces 510 and 550 may be distributed along the surface of the counter. In some cases, one or both induction heating surfaces 510 and 550 may be installed below a top surface, such as being located underneath a countertop. In such cases, a minimum spacing between units may be required, such as a spacing of several inches (e.g., about 1 inch, about 2 inches, etc.). In some cases, the induction heating surfaces 510 and 550 may be designed such that heating surfaces of different induction heating surfaces may be substantially adjacent to each other. To facilitate the use of the induction heating surface as both a countertop and built-in unit, a ledge may be incorporated into the enclosure and may be prominent enough to act as a stop as it is dropped into a countertop opening. Such a ledge may also not be so prominent as to interfere with the use of each of the induction heating surface 510 and 550 as a countertop unit. In some cases, the control panels for each installed induction heating surface may be located adjacent or near to the associated heating surface. For example, a first induction heating surface may be configured to heat items placed at a first location of the countertop to a first temperature setting and a second induction heating surface may be configured to heat items placed at a second location of the countertop surface to a second temperature setting.

Figure 6:
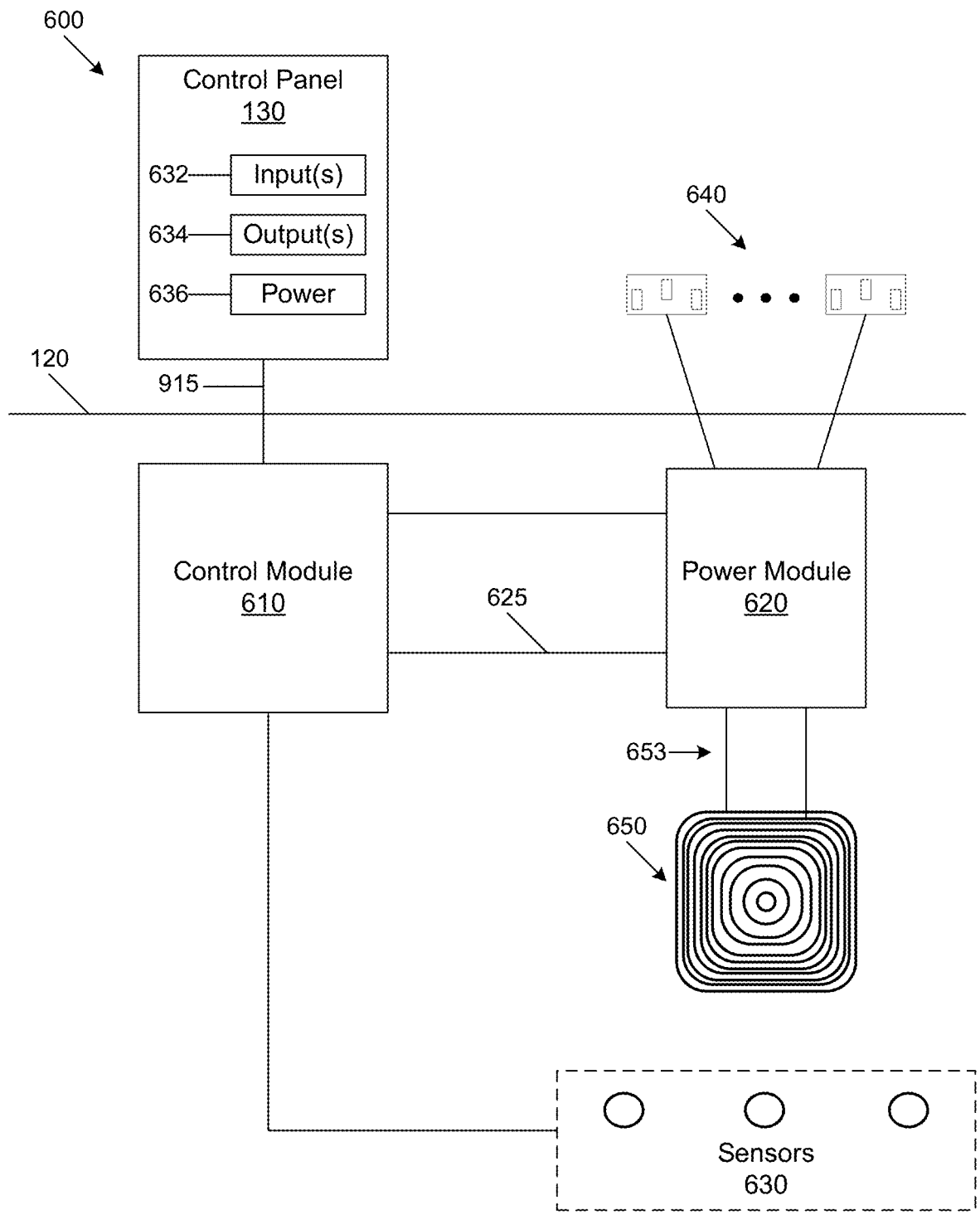
FIG. 6 shows a line drawing showing an illustrative block diagram of an induction heating surface according to aspects of the present disclosure.

FIG. 6 shows a line drawing of a block diagram of an illustrative induction heating surface 600 according to aspects of this disclosure. The induction heating surface 600 may include the control panel 130 and one or more power receptacles 640 accessible to a user at the exterior of the enclosure 120. The control panel 130 may be electrically connected to the control module 610 via an electrical interface 615. The control panel 130 may include one or more inputs 632, one or more outputs 634, and a power switch 636. In some cases, the inputs 632 and the outputs 634 may be integrated into common components (e.g., a switch and a visual indicator such as an LED, a digital display screen and the like) or may be separate components. The control module 610 may include a processor (e.g., a microprocessor, an application specific integrated circuit (ASIC), a digital signal processor (DSP), etc.) and a memory device storing instructions that, when executed by the processor, cause the induction heating surface 600 to sense a vessel placed on the heating surface 110 based on information sensed via the coil 650 and/or the sensors 630. The sensors 630 may include thermal sensors, voltage sensors, current sensors, and/or other such devices capable of sensing electrical and/or heat energy supplied to and/or by the coil 650. The one or more power receptacles 640 may be capable of accepting a power cord to supply electrical energy to the induction heating surface 600 via a first power receptacle and/or to additional induction heating surfaces, or other devices, electrically coupled to a second power receptacle. In some cases, a power cord may be physically detachable from the power receptacles 640. In some cases, the power cord may be physically integrated into the induction heating surface, while one or more of the power receptacles 640 may be used to provide power to external devices.

In some cases, the power receptacles 640 may be electrically connected to a power module 620. The power module 620 may receive AC power from one of the power receptacles 640 (or a separately connected electrical power cord) and may provide electrical energy to one or more external devices via a different power receptacle. The power module may include a voltage converter that may convert AC power into a DC voltage (e.g., 3 volts, 5 volts, etc.) to provide power to the control module 610 and/or the control panel 130. The power module 620 may be controlled via one or more control lines 625 by the control module 610 to provide electrical energy to the one or more coils 650 via the power connection 653.

In some cases, a user may turn the induction heating surface on via the power input 636. The user may also specify, via an input 632 (e.g., a switch), a temperature or temperature range to heat a vessel placed on the surface of the induction heating surface 600. The control module 610 may provide a visual indication of the heat setting to the user via the outputs 634 (e.g., an LED). Once activated, the control module may provide a control signal to the power module 620 to provide a specified amount of electrical energy to the one or more coils 650, generating a current through the one or more coils. The control module 610 may monitor the current through the coils via a current sensing and/or a voltage sensing circuit. The control module 610 may analyze the current value from the current sensing circuit and/or the voltage value from the voltage sensing circuit to identify whether a vessel has been placed on the heating surface 110. In some cases, a low current value may indicate that no vessel has been placed on the surface and after a duration, the control module 610 may instruct the power module 620 to reduce power or no longer supply power to the one or more coils. If the control module 610 senses a current meeting a predetermined threshold, the control module 610 may identify that an induction heating capable vessel has been placed on the heating surface 110 and send a command to the power module 620 to increase power applied to one or more of the coils 650. The control module then may monitor the current and/or signals received from the sensors (e.g., thermistors) to control the coils to heat the vessel to the commanded heat set point.

In some cases, one or more additional sensors may also be used to identify whether a vessel has been placed on the heating surface 110, such as a heat sensor (e.g., a thermistor), a pressure sensor (e.g., sensing a weight applied to the heating surface) and/or the like. In some cases, if an induction incompatible vessel is placed on the heating surface, a signal received from the pressure sensor may be compared to a predetermined weight threshold, by the control module 610 to issue an error if the weight threshold has been met without a heat threshold and/or a current threshold also being met.

While illustrative apparatuses and methods as described herein embodying various aspects of the present disclosure are shown, it will be understood by those skilled in the art, that the disclosure is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present disclosure. The description is thus to be regarded as illustrative instead of restrictive on the present disclosure.

The invention claimed is:

1. An induction heating surface comprising:
   a top surface for placement of a plurality of induction-ready vessels, the top surface comprising a material of a surrounding countertop surface;
   a heating surface positioned adjacent and below the top surface, wherein the top surface obscures a view of the heating surface;
   a control unit comprising a processor and non-transitory memory, wherein the memory stores instructions that, when executed by the processor, cause the control unit to control heating of the plurality of induction ready vessels; and a plurality of heating elements dispersed beneath the heating surface to heat each of the plurality of induction-ready vessels, wherein the plurality of heating elements are formed from a same continuous conductive element and comprise a plurality of non-concentric coil shaped sections, wherein a first coil shaped section of the plurality of non-concentric coil shaped sections is formed from a first portion of the continuous conductive element and wherein a second coil shaped section, adjacent to and non-concentric with the first coil shaped section, is formed from a second portion of the same continuous conductive element.

2. The induction heating surface of claim 1, wherein the heating surface allows for heating of each of the plurality of induction-ready vessels at any location on the heating surface.

3. The induction heating surface of claim 1, wherein the instructions further cause the control unit to provide a plurality of pre-defined heating set-points.

4. The induction heating surface of claim 3, wherein the plurality of pre-defined heating set-points include a low temperature range, a low-medium temperature range, a high-medium temperature range, and a high temperature range.

5. The induction heating surface of claim 3, wherein the plurality of pre-defined heating set-points include a low temperature range of 145 degrees F. to 155 degrees F., a low-medium temperature range of 156 degrees F. to 165 degrees F., a high-medium temperature range of 166 degrees F. to 175 degrees F., and a high temperature range of 176 degrees F. to 185 degrees F.

6. The induction heating surface of claim 1, including an enclosure configuring the induction heating surface as a stand-alone unit.

7. The induction heating surface of claim 1, including an enclosure configuring the induction heating surface as drop-in unit for installation in a surface.

8. The induction heating surface of claim 1, including an enclosure configuring the induction heating surface for either a stand-alone unit or a drop-in unit.

9. The induction heating surface of claim 1, comprising a plurality of temperature sensors.

10. The induction heating surface of claim 9, wherein each of the plurality of temperature sensors are configured to sense a temperature at a different location of the heating surface.

11. The induction heating surface of claim 9, wherein each of the plurality of temperature sensors are negative temperature coefficient (NTC) type devices.

12. The induction heating surface of claim 1, wherein each of the plurality of heating elements are arranged as a rectangular coil and are positioned adjacent to each other and are positioned lengthwise from front to back of the induction heating surface.

13. The induction heating surface of claim 1, wherein the plurality of heating elements comprises three heating elements capable each being positioned to heat an adjacent third of the heating surface.

14. The induction heating surface of claim 1, wherein each of the the plurality of heating elements comprises a coil configured as an 18 strand by 36 circle, with 0.3 mm wire.

15. The induction heating surface of claim 1, wherein each the plurality of heating elements comprises a coil having an inductance of 90 uH±5.

16. The induction heating surface of claim 1, wherein the top surface comprises simulated stone.

17. The induction heating surface of claim 1, wherein at least two of the plurality of vessels are of different sizes.

18. The induction heating surface of claim 1, comprising a power receptacle to provide power to at least one additional device.

19. The induction heating surface of claim 1, wherein a top surface of the heating surface is hidden from view.

20. The induction heating surface of claim 1, wherein the heating surface includes one or more openings, wherein each of the one or more opening is adjacent to a temperature sensor.

* * * * *